US005487006A

United States Patent [19]
Kakizaki et al.

[11] Patent Number: 5,487,006
[45] Date of Patent: Jan. 23, 1996

[54] SYSTEM FOR DETECTING ROAD ROUGHNESS FOR SUSPENSION CONTROL AND AUTOMOTIVE SUSPENSION CONTROL SYSTEM UTILIZING THUS DETECTED ROAD ROUGHNESS AS CONTROL PARAMETER

[75] Inventors: Shinobu Kakizaki; Minoru Taniguchi; Fukashi Kanai, all of Kanagawa, Japan

[73] Assignee: Atsugi Unisia Corporation, Kanagawa, Japan

[21] Appl. No.: 152,880

[22] Filed: Nov. 16, 1993

Related U.S. Application Data

[63] Continuation of Ser. No. 433,151, Nov. 8, 1989, abandoned.

[30] Foreign Application Priority Data

Nov. 14, 1988 [JP] Japan .................................. 63-287072
Nov. 29, 1988 [JP] Japan .............................. 63-155439 U

[51] Int. Cl.⁶ .................................................. B60G 25/00
[52] U.S. Cl. ...................................... 364/424.05; 280/707
[58] Field of Search ........................ 364/424.05, 424.01, 364/426.01, 434; 280/707, 714

[56] References Cited

U.S. PATENT DOCUMENTS

| | | | |
|---|---|---|---|
| 4,673,194 | 6/1987 | Sugasawa | 364/424.05 X |
| 4,700,971 | 10/1987 | Doi et al. | 364/424.05 X |
| 4,821,189 | 4/1989 | Hennecke et al. | 364/424.05 |
| 4,834,419 | 5/1989 | Kozaki et al. | 280/707 |
| 4,837,727 | 6/1989 | Tashiro et al. | 364/424.05 X |
| 4,852,903 | 8/1989 | Tanaka et al. | 280/707 X |
| 4,853,860 | 8/1989 | Achenbach | 280/707 X |
| 4,865,347 | 9/1989 | Fukushima et al. | 280/707 |

*Primary Examiner*—Edward R. Cosimano
*Assistant Examiner*—Edward Pipala
*Attorney, Agent, or Firm*—Ronald P. Kananen

[57] ABSTRACT

An automotive suspension control system employs a lateral acceleration sensor monitoring a lateral acceleration exerted on a vehicular body. The output level of the lateral acceleration sensor is processed to detect frequency of a occurrence of lateral acceleration magnitude greater than a predetermined threshold level within a predetermined period of time or a predetermined distance to travel. Judgement is made that the vehicle is on a rough road when the detected frequency becomes higher than or equal to a predetermined rough road criterion. The suspension control system, according to the present invention, is responsive to the judgement of rough road condition, to order softer suspension characteristics for satisfactorily suppressing vehicular body attitude change by absorbing vibration energy.

24 Claims, 6 Drawing Sheets

SYSTEM FOR DETECTING ROAD ROUGHNESS FOR SUSPENSION CONTROL AND AUTOMOTIVE SUSPENSION CONTROL SYSTEM UTILIZING THUS DETECTED ROAD ROUGHNESS AS CONTROL PARAMETER

This application is a continuation of application Ser. No. 07/433,151 filed Nov. 8, 1989 now abonadoned.

BACKGROUND OF THE INVENTION

1. Filed of the Invention

The present invention relates generally to a suspension control system for an automotive vehicle for adapting vehicular suspension characteristics to vehicular driving conditions and thereby achieving a satisfactory level of vehicular riding comfort and driving stability. More specifically, the invention relates to a technology for detecting or discriminating a road roughness dependent vehicular body attitude change mode among various modes of vehicular body change in order to accurately perform road roughness adapted suspension control. Still more particularly, the invention relates to a technology for detecting the road roughness condition requiring a roughness adapted suspension control, by means of an acceleration sensor or a G sensor monitoring lateral acceleration exerted on the vehicular body.

2. Description of the Background Art

In the modern automotive technologies, it is one of the trendy and important technologies for controlling suspension systems for adapting suspension characteristics, i.e. stiffness or damping characteristics, depending upon a vehicle driving condition. In general, adjustment of the suspension characteristics is performed in order to achieve both of riding comfort and vehicular driving stability at a high level. For instance, in order to provide higher level riding comfort, softer suspension characteristics are generally preferred in the normal and steady vehicle traveling condition. On the other hand, in a particular driving condition, such as cornering, or an accelerating or a decelerating state, a higher level riding comfort may be achieved at harder suspension characteristics. Furthermore, in many of the latter cases, a harder suspension is also desired from the viewpoint of vehicular driving stability. Therefore, in order to ascertain harmonization of the vehicular riding comfort and driving stability, it is essential to detect or discriminate various vibration modes on the vehicular body resulting from various factors or vehicular driving parameters.

In case of vehicular body vibration caused by roughness on the road surface, Japanese Patent First (unexamined) Publication (Tokkai) Showa 60-151111 proposes technology for detecting a road roughness originated vehicular body vibration by means of a vehicular stroke sensor which monitors a relative distance between a vehicular body and a suspension member rotatably supporting a road wheel. The shown system is facilitated based on the fact that different modes of vehicular vertical vibrations may have different frequency ranges in vibration. This is true in some aspect. For instance, in case that the cause of vehicular body vibration is road shock input through the road wheel, the vibration frequency is relatively high. On the other hand, in case that the cause of vehicular body vibration is a vehicular body attitude change, such as rolling, pitching or so forth, originated by an external force exerted on the vehicular body, the vibration frequency is relatively low. Therefore, a certain accuracy level discrimination can be performed for detecting vibration modes of the vehicular body by checking the frequency range of vibration.

However, on some occasions, the prior proposed technology in a discriminating vibration mode of the vehicular body is not satisfactorily accurate. For instance, when the magnitude of road roughness is substantial to cause a vehicular attitude change, the instantaneous vehicular body behaviour becomes similar to that in the vehicular rolling or pitching. In case that the vehicular body attitude change is caused due to a roughness of the road surface, it is generally desirable to soften suspension characteristics for absorbing vibration energy and thereby minimize vehicular body vibration. On the other hand, in case that the vehicular body attitude change is caused due to lateral acceleration during cornering which results in vehicular rolling or to longitudinal acceleration during vehicular acceleration or deceleration which results in vehicular pitching, it is desired to provide a harder suspension in view of vehicular driving stability. Therefore, depending upon the modes of vibration, the direction to adjust the suspension characteristics becomes opposite. In this reason, it is quite important for accurately detecting mode of variation cause on the vehicular body in order to ascertain adaption of the suspension characteristics to the vehicular driving condition.

In addition, in case of the above-identified prior proposed suspension control system, a vertical stroke sensor has to be provided for each of the suspension systems, i.e. front-left, front-right, rear-left and rear-right suspension systems. This causes a higher system cost and complicated circuit construction to facilitate use in the limited space of the automotive vehicle.

SUMMARY OF THE INVENTION

In view of the problems in the prior art, it is an object of the present invention to provide an automotive suspension control system with an accurate detection of road roughness condition.

Another object of the invention is to provide an automotive suspension control system which can detect road roughness originated vehicular body vibration with a sole sensor which monitors lateral acceleration exerted on the vehicular body.

In order to accomplish the aforementioned and other objects, an automotive suspension control system according to the present invention, employs a lateral acceleration sensor monitoring a lateral acceleration exerted on a vehicular body. The output level of the lateral acceleration sensor is processed to detect the frequency of occurrence of lateral acceleration having a magnitude greater than a predetermined threshold level within a predetermined period of time or a predetermined distance to travel. Judgement is made that the vehicle is on a rough road when the detected frequency becomes higher than or equal to a predetermined rough road criterion.

The suspension control system, according to the present invention, is responsive to the judgement of a rough road condition, to order softer suspension characteristics for satisfactorily suppressing vehicular body attitude change by absorbing vibration energy.

In addition, the present invention further performs suspension control for adjusting the suspension characteristics by taking a vehicle speed as an additional parameter. Namely, the suspension control system discriminates a vehicular traveling speed higher than a predetermined low vehicular speed criterion to set the suspension characteristic harder than that at the vehicle speed lower than or equal to the low vehicle speed criterion. This provides higher level harmonization of the riding comfort and driving stability. According to one aspect of the invention, a system for detecting road roughness condition comprises:

a sensor means for monitoring lateral acceleration exerted on a vehicular body for producing a lateral acceleration indicative sensor signal;

means for detecting occurrence of the lateral acceleration indicative sensor signal representing a lateral acceleration in a magnitude greater than a predetermined value to produce a detection signal;

means for counting a number of the detection signals over a predetermined period to provide a counter signal indicative of the counted value; and means for comparing the counter signal value with a predetermined threshold value for producing a rough road condition indicative discrimination signal when the counter signal value is greater than or equal to the threshold value.

In the preferred construction, the counting means varies the length of the predetermined period depending upon a vehicle speed so that the predetermined period is reduced according to an increasing of the vehicle speed. Also, the sensor means may be designed to produce a first polarity of a lateral acceleration indicative sensor signal in response to the lateral acceleration in a first direction and a second polarity of a lateral acceleration indicative sensor signal in response to the lateral acceleration in a second direction, in which the second polarity is opposite to the first polarity and the second direction is opposite to the first direction, and the detecting means produces the detection signal when the lateral acceleration indicative signal value is out of a predetermined range of values defined by a first polarity of criterion value and a second polarity of criterion value.

According to another aspect of the invention, a system for detecting road roughness condition comprises:

a sensor means for monitoring longitudinal acceleration exerted on a vehicular beady for producing a longitudinal acceleration indicative sensor signal;

means for detecting occurrence of the longitudinal acceleration indicative sensor signal representing a longitudinal acceleration in a magnitude greater than a predetermined value to produce a detection signal;

means for counting a number of the detection signals over a predetermined period to provide a counter signal indicative of the counted value; and means for comparing the counter signal value with a predetermined threshold value for producing a rough road condition indicative discrimination signal when the counter signal value is greater than or equal to the threshold value.

According to a further aspect of the invention, a suspension control system for an automotive vehicle comprises:

a variable characteristics suspension system disposed between a vehicular body and a suspension member which rotatably supports a road wheel, the variable characteristics suspension system being variable of suspension characteristics over a plurality of characteristics between hard suspension characteristics and soft suspension characteristics;

a sensor means for monitoring various preselected suspension control parameters including acceleration exerted on a vehicular body to affect to vehicular body attitude for producing a plurality of sensor signals including an acceleration indicative sensor signal;

means for detecting occurrence of the acceleration indicative sensor signal representing an acceleration in a magnitude greater than a predetermined value to produce a detection signal;

means for counting a number of the detection signals over a predetermined period to provide a counter signal indicative of the counted value;

means for comparing the counter signal value with a predetermined threshold value for producing a rough road condition indicative discrimination signal when the counter signal value is greater than or equal to the threshold value;

means for deriving a suspension control signal for adjusting suspension characteristics of the variable characteristics suspension system, the suspension control signal deriving means being responsive to the rough road condition indicative discrimination signal to produce the suspension control signal ordering a specific suspension characteristic set between the hard and soft suspension characteristics for ascertaining both vehicular driving stability and riding comfort.

In the preferred construction, the sensor means may monitor a lateral acceleration exerted on the vehicular body. The variable characteristics suspension system may be variable of suspension charateristics between a hard suspension characteristic, a soft suspension characteristic and a medium suspension characteristic which is set at intermediate between the hard and soft suspension characteristic, and the suspension control system selects the medium mode in response to the rough road condition indicative discrimination signal. In such case, the variable characteristic suspension system may employ a three-way variable damping force shock absorber.

In the alternative embodiment, the suspension control system may further comprise a vehicle speed sensor for monitoring vehicle speed to produce a vehicle speed indicative signal, and the suspension control signal deriving means is responsive to the vehicle speed indicative signal having a value smaller than or equal to a vehicle speed reference value representative of a substantially low vehicle speed criterion, to select soft suspension characteristics and select the medium suspension characteristics otherwise.

According to a still further aspect of the invention, a suspension control system for an automotive vehicle comprises:

a variable characteristics suspension system disposed between a vehicular body and a suspension member which rotatably supports a road wheel, the variable characteristics suspension system being variable of suspension characteristics over a plurality of characteristics between hard suspension characteristics and soft suspension characteristics;

a first sensor means for monitoring a preselected parameter representative of roughness condition of a road to produce a rough road condition indicative signal;

a second sensor means for monitoring a vehicle speed to produce a vehicle speed indicative signal;

means for detecting a rough road condition on the basis of the road roughness indicative signal;

means for detecting a substantially low vehicle speed lower than or equal to a predetermined low vehicle speed criterion to produce a low vehicle speed indicative signal; and means responsive to the rough road condition indicative signal to produce a suspension control signal ordering a specific suspension characteristics set between the hard and soft suspension characteristics when the low vehicle speed indicative signal is absent and ordering the soft suspension characteristics when the low vehicle speed indicative signal is present.

In this embodiment, a first sensor means monitors vehicular attitude affecting acceleration exerted on the vehicular body for producing the roughness condition indicative signal representative of the monitored acceleration as the preseleeted parameter; and the means for detecting rough load condition comprises:

means for detecting occurrence of the acceleration indicative sensor signal representing an acceleration in a magnitude greater than a predetermined value to produce a detection signal;

means for counting a number of the detection signals over a predetermined period to provide a counter signal indicative of the counted value; and means for comparing the counter signal value with a predetermined threshold value for producing a rough road condition indicative discrimination signal when the counter signal value is greater than or equal to the threshold value.

BRIEF DESCRIPTION OF THE DRAWINGS

The present invention will be understood more fully from the detailed description given herebelow and from the accompanying drawings of the preferred embodiments of the invention, which, however, should not be taken to limit the specific embodiment or embodiments, but are for explanation and understanding only.

In the drawings.

DESCRIPTION OF THE PREFERRED EMBODIMENT

Figure 1:
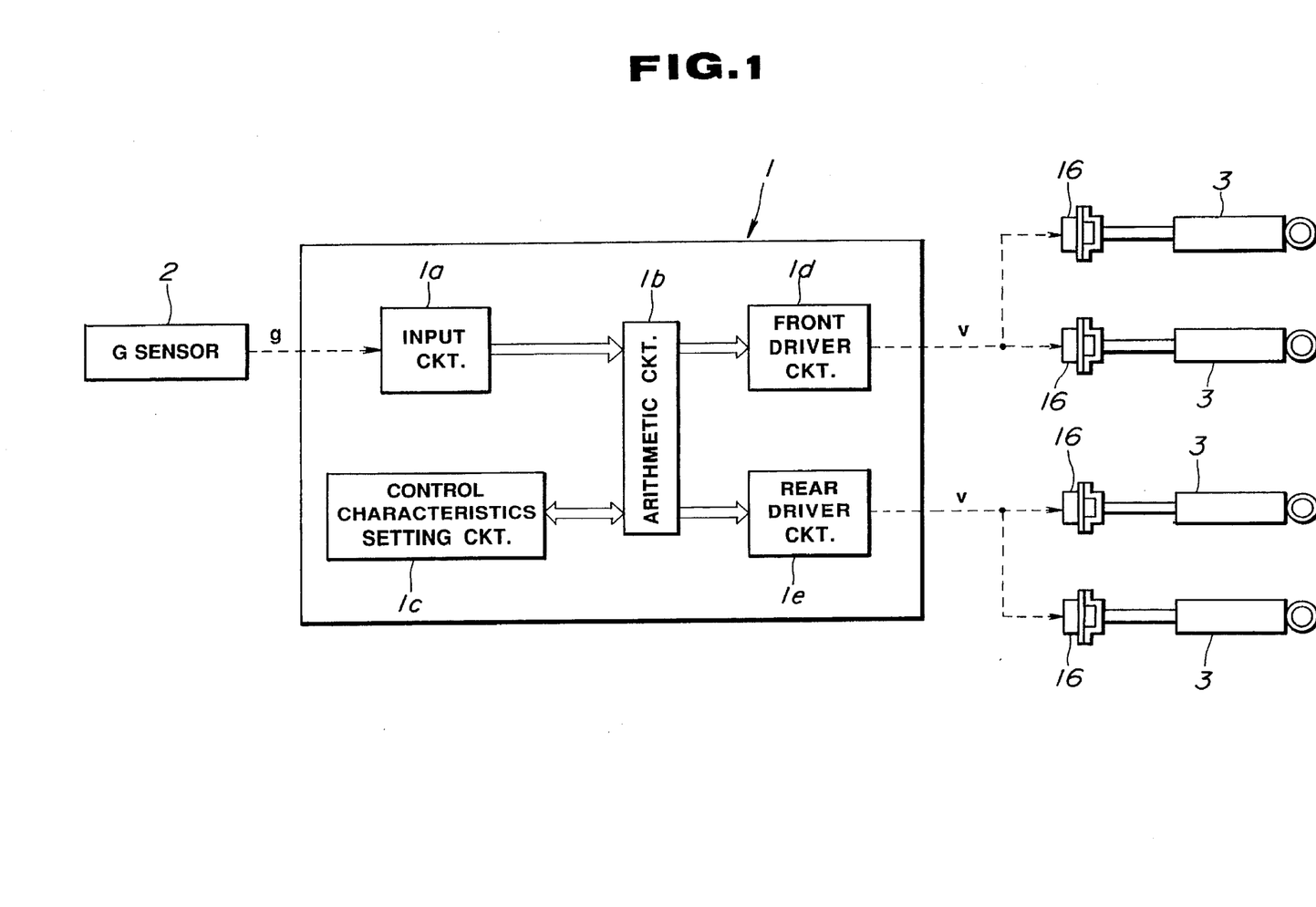
FIG. 1 is a schematic block diagram of the first embodiment of an automotive suspension control system according to the present invention.

Referring now to the drawings, particularly to FIG. 1, the preferred embodiment of an automotive suspension control system, according to the present invention, includes a control unit 1 which generally composed of a microprocessor-based data processing system. The control unit 1 has an input circuit 1a connected to a sensor 2 which monitors lateral acceleration exerted on the vehicular body, which sensor will be hereafter referred to as "G sensor". As the G sensor, it is possible to employ any type of acceleration sensors which are suitable for monitoring lateral acceleration exerted on the vehicle. For example, the G sensor 2 may comprise a pendulum and means for generating voltage signal depending upon magnitude of oscillation of the pendulum. The G sensor 2 produces a sensor signal g representative of the magnitude and direction of the lateral acceleration exerted on the vehicular body. The lateral acceleration indicative sensor signal g of the G sensor 2 is processed by an arithmetic circuit 1b for deriving control signals v. In the shown embodiment, the arithmetic circuit 1b separately derives a front suspension control signal and rear suspension control signal for performing suspension control for front and rear suspension systems independently of each other.

The arithmetic circuit 1b supplies the front and rear suspension control signals v to respective of front-left, front-right, rear-left and rear-right suspension systems via a front suspension driver circuit 1d and a rear suspension driver circuit 1e. Each of the front-left, front-right, rear-left and rear-right suspension systems includes variable damping-force shock absorber 3 which has an actuator 16. In the shown embodiment, the actuator 16 comprises an electrically operable stepping motor.

In order to derive the front and rear suspension control signals, the arithmetic circuit 1b is connected to a control characteristics setting circuit 1c which generally comprises memory storing reference values representative of various criteria, threshold values and so forth, to be compared with lateral acceleration indicative sensor signal g.

Figure 2:
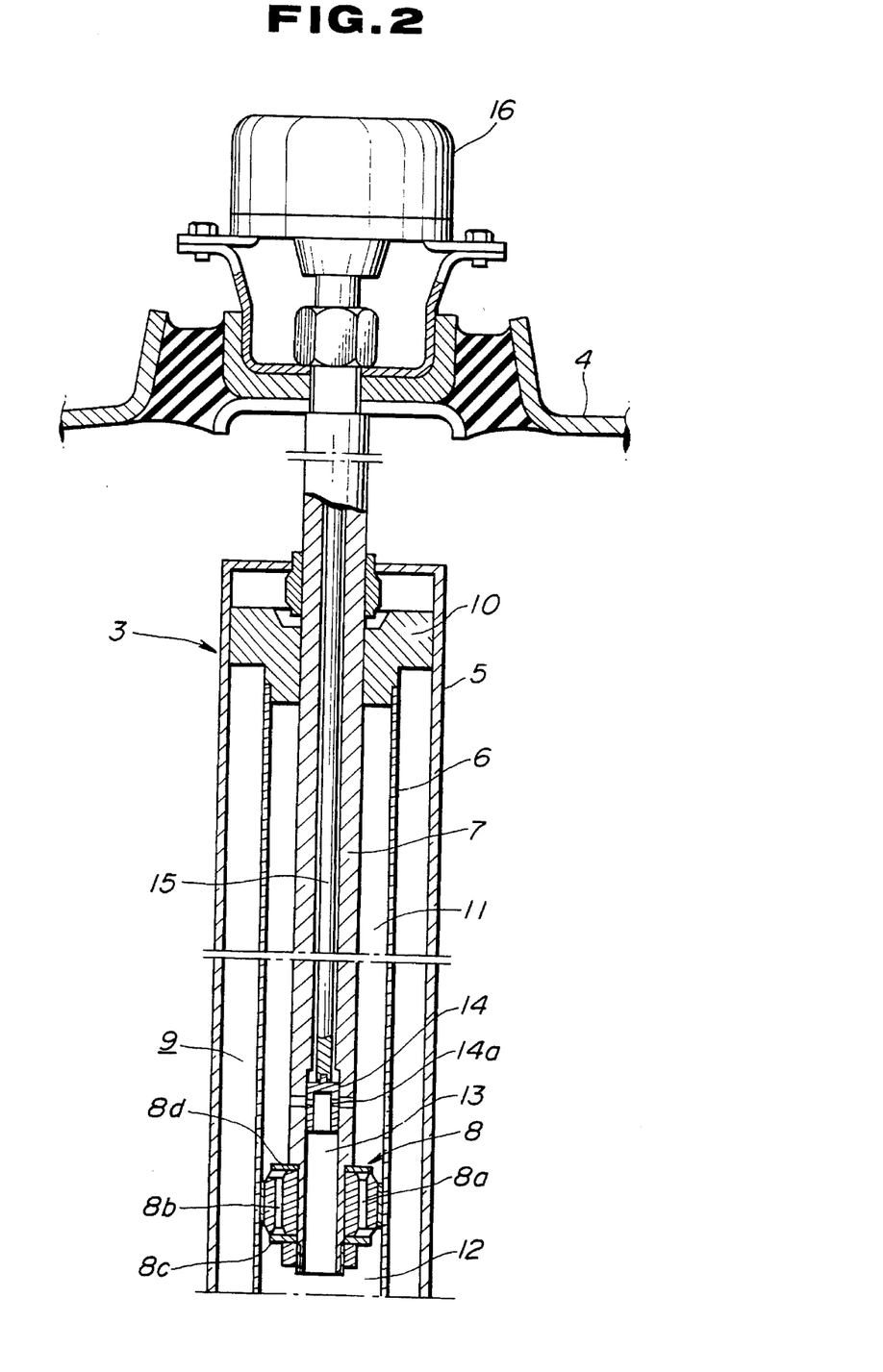
FIG. 2 is a partial section of a variable damping-characteristics shock absorber to be employed in the first embodiment of the suspension control system of FIG. 1.

FIG. 2 shows the preferred construction of the variable damping-force shock absorber 3 to be employed in the first embodiment of the suspension control system of FIG. 1.

The shock absorber 3 has outer and inner cylinders 5 and 6 co-axially arranged with each other. A piston 8 is disposed within the internal space of the inner cylinder 6. The piston 7 is connected to a vehicular body 4 via a piston rod 7 and a bushing assembly. The piston rod 7 is guided by a rod guide 10 which is secured to the top end of the inner cylinder 6. Though FIG. 2 does not illustrate clearly, the shock absorber 3 has a bottom valve for adjusting fluid flow rate between the interior of the inner cylinder 6 and an annular chamber 9 defined between the inner and outer cylinders 6 and 5.

The interior space of the inner cylinder 6 is divided into upper and lower fluid chambers 11 and 12. The upper and lower fluid chambers 11 and 12 are communicated via flow restrictive orifices 8a and 8b defined through the piston 8. The orifice 8b has the lower end opening to the lower fluid chamber 12 and openably closed by means of a resilient disc valve 8c. Similarly, the orifice 8a has the upper end opposing to the upper fluid chamber 11 and operably closed by means of a resilient disc valve 8d. Therefore, during the piston stroke in a bounding direction compressing the upper fluid chamber, the working fluid in the upper fluid chamber 11 flows into the lower fluid chamber 12 via the orifice 8b and a gap formed by deformation of the disc valve 8c. On the other hand, during the piston rebounding stroke while compressing the lower fluid chamber 12, the working fluid in the lower fluid chamber flows into the upper fluid chamber 11 via the orifice 8a and a gap defined by deformation of the disc valve 8d.

The piston rod 7 defines an axially-extending opening communicated with a by-pass path 8 defined in the lower end portion of the piston rod and having a lower end opening to the lower fluid chamber. A rotary valve 14 is rotatably disposed within the by-pass path 8. The rotary valve 14 is connected to an actuator rod 15 which transfers rotating force generated by the actuator 16 for adjusting the angular position of the rotary valve. The rotary valve 14 defines a plurality of radially extending openings 14a having mutually different fluid flow path areas. The rotary valve 14 at selected angular position aligns one of the radially extending openings 14a to a radially extending orifice defined through the piston rod 7 and opening to the upper fluid chamber 11. Therefore, according to the angular position of the rotary valve, the magnitude of fluid flow restriction for the working fluid flowing through the by-pass path 8 is variable for varying damping characteristics of the shock absorber 3. In the shown embodiment, the rotary valve 14 is designed to provide three-way variable damping characteristics for varying the damping characteristics between HARD mode, MEDIUM mode and SOFT mode. At the HARD mode position, the fluid flow path area provided by tile radially extending opening 14a becomes minimum or zero for greatest flow restriction magnitude. On the other hand, at the SOFT mode position, the fluid flow path area of the radially extending opening 14a becomes maximum for the smallest magnitude of flow restriction.

Further detail of the three way adjustable shock absorber will be seen from the United States Patents listed herebelow.

U.S. Pat. No. 4,527,676, issued on Jul. 9, 1985

U.S. Pat. No. 4,620,619, issued on Nov. 4, 1986

U.S. Pat. No. 4,600,215, issued on Jul. 15, 1989

U.S. Pat. No. 4,770,438, issued on Sep. 13, 1988

The disclosures of the above-identified U.S. Patents are herein incorporated by reference for the sake of disclosure. In addition, though the shown embodiment employs a three way adjustable shock absorber, it is possible to employ a two way adjustable shock absorber. Examples of the two way adjustable shock absorbers are shown in the following United States Patents.

U.S. Pat. No. 4,866,626, issued on Aug. 11, 1987

U.S. Pat. No. 4,652,101, issued on Mar. 24, 1987

U.S. Pat. No. 4,796,911, issued on Jan. 10, 1989

The disclosures of the above-identified U.S. Patents are also herein incorporated by reference for the sake of disclosure.

Figure 3:
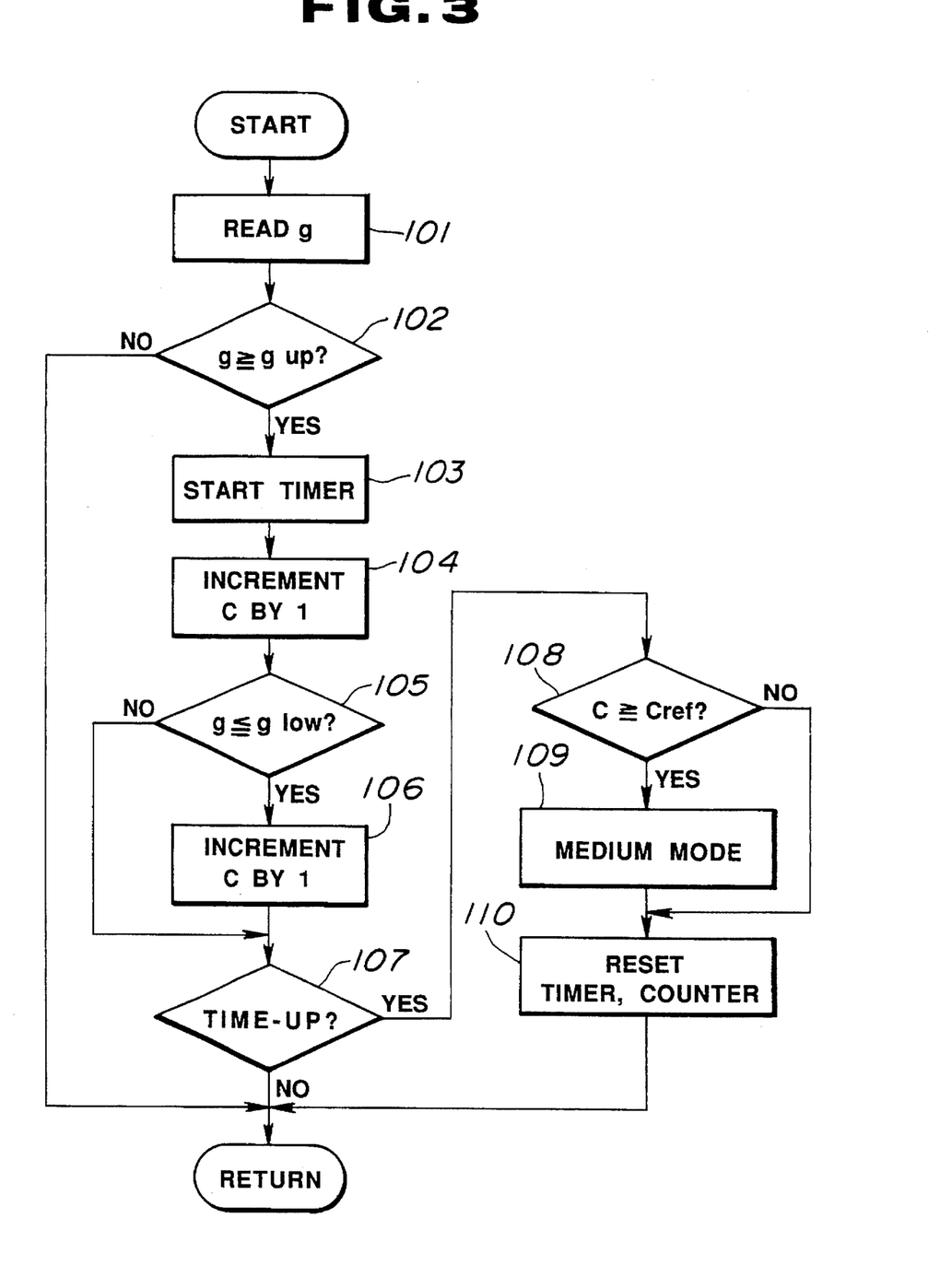
FIG. 3 is a flowchart showing a process of road roughness dependent suspension characteristics controls to be performed in the first embodiment of the suspension control system of FIG. 1.

FIG. 3 shows a flowchart showing operation of the shown embodiment of the suspension control system of FIG. 1. The shown routine is formulated as one of a plurality of vehicular control routines for controlling various vehicular equipments, such as an engine, brake system, a power transmission, a power steering system and so forth. The shown routine is executed as one of time triggered interrupt routine to be executed with a regular interval, e.g. 20 ms.

Figure 4:
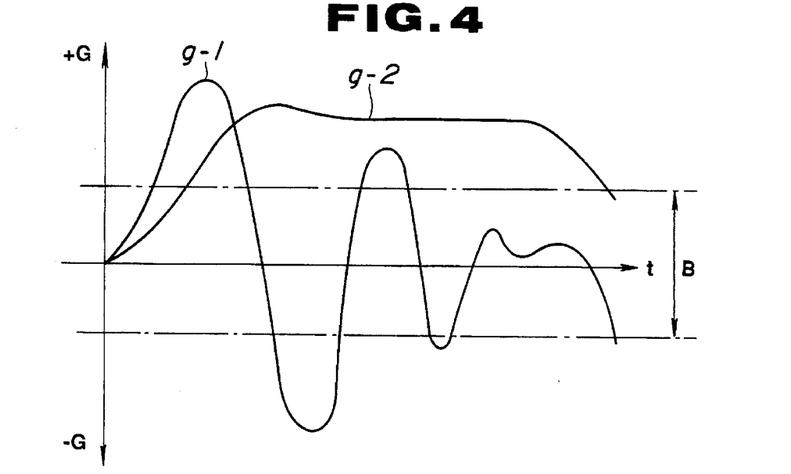
FIG. 4 is a chart showing variation of a lateral acceleration indicative signal which is used as parameter signal for performing roughness dependent suspension control.

Immediately after starting execution, a lateral acceleration indicative sensor signal g is read out at a step 101. The lateral acceleration indicative sensor signal g is then compared with a upper reference value $g_{up}$ representative of a lateral acceleration threshold value, at a step 102. As shown in FIG. 4, the upper acceleration reference value $g_{up}$ is set at a value defining an upper border of deadband B centered at zero lateral acceleration. If the lateral acceleration indicative sensor signal g is smaller than the upper reference value $g_{up}$, the routine goes END and process returns to a main routine or background job governing various routines. On the other hand, when the lateral acceleration indicative sensor signal g is greater than or equal to the upper reference value $g_{up}$, a timer in the arithmetic circuit 1b is triggered to start measurement of an elapsed time, at a step 103. A timer period is variable depending upon the vehicle speed. Therefore, although it is not illustrated in FIG. 1, the control unit 1 receives a vehicle speed indicative signal from a vehicle speed sensor which is of a per se well known construction. The arithmetic circuit 1b thus sets the timer period to maintain the timer active depending upon the vehicle speed.

A counter in the arithmetic circuit 1b is incremented by one (1) at a step 104. Then, at a step 105, the lateral acceleration sensor signal g is compared with a lower reference value $g_{low}$ which defines a lower border of the deadband B. If the lateral acceleration sensor signal g is smaller than or equal to the lower reference value $g_{low}$, the counter is incremented by one (1) at a step 106. Then, the timer value is checked if the timer value has reached the timer period at a step 107. In case that the lateral acceleration sensor signal g is greater than the lower reference value $g_{low}$ as checked at the step 105, the process directly goes to the step 107.

If the timer value is smaller than the timer period as checked at a step 107, the process goes to END. On the other hand, when the timer value is greater than or equal to the timer period as checked at the step 107, the counter value C is compared with a counter reference value $C_{ref}$ at a step 108. If the counter value C is greater than or equal to the counter reference value $C_{ref}$, the suspension control signal v ordering MEDIUM mode is produced at a step 109. Thereafter, the timer and counter are reset at a step 110. On the other hand, if the counter value C is smaller than the counter reference value $C_{ref}$ as checked at the step 108, the process directly goes to the step 110.

As will be appreciated, according to the shown process, a frequency of opposite direction of lateral acceleration of greater magnitude than that of the lateral acceleration criteria represented by the upper and lower reference values $g_{up}$ and $g_{low}$ is checked for making a discrimination that the vehicle is on a rough road when the frequency is higher than a predetermined value. Furthermore, in accordance with the shown embodiment, since the timer period is adjusted depending upon the vehicle speed, vehicle speed dependent characteristics can also be introduced in the road roughness dependent suspension control.

Figure 5:
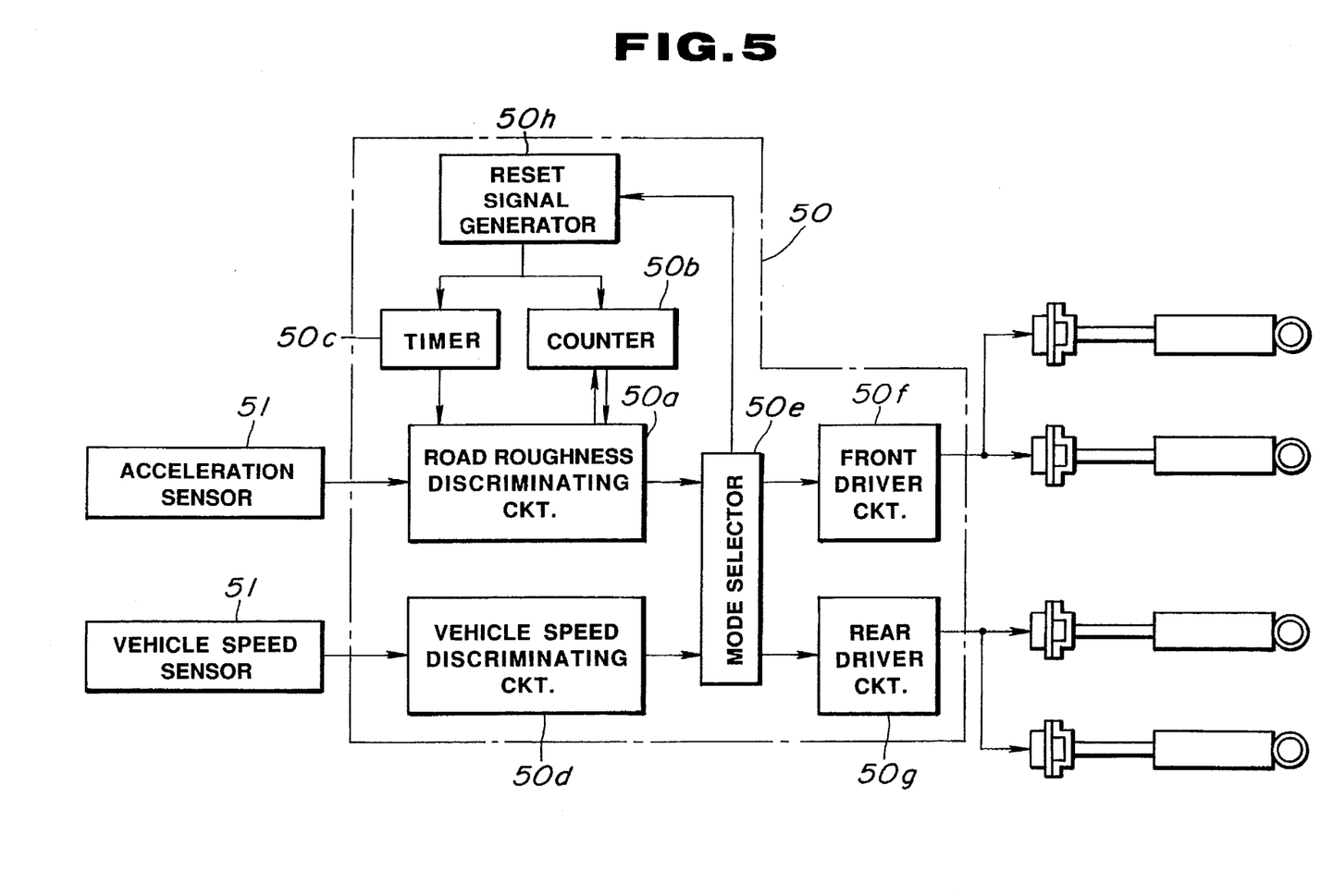
FIG. 5 is a block diagram of the second embodiment of a suspension control system according to the invention.

FIG. 5 shows the second embodiment of the suspension control system according to the present invention. The shown embodiment of the suspension control system includes a control unit 50 which is composed of a microprocessor-based data processing system. The control unit 50 is connected to a vibration sensor or acceleration sensor 51 for monitoring vibration energy exerted on the vehicular body. As in the former embodiment, the preferred construction of the shown embodiment of the suspension control system employs the G sensor as the vibration or acceleration sensor 51. The G sensor 51 produces the lateral acceleration indicative sensor signal g. The control unit 50 is also connected to a vehicle speed sensor 52 which produces a vehicle speed indicative sensor signal V.

The control unit includes a road roughness discriminating circuit 50a which receives the lateral acceleration indicative sensor signal g to compare with the upper and lower reference values $g_{up}$ and $g_{low}$ to produce a pulse signal when the lateral acceleration sensor signal value g is greater than or equal to the upper reference values $g_{up}$ or when the lateral acceleration sensor signal value is smaller than or equal to the lower reference value $g_{ref}$. The pulse signal is fed to a counter 50b which counts up the pulse signal to produce a counter signal C. The control unit 50 also have a timer 50c which is triggered by the first occurrence of the pulse signal to start measurement of the elapsed time. The road roughness discriminating circuit 50a receives the counter signal C to compare with the counter reference value $C_{ref}$ at a timing that the elapsed time measured by the timer 50c reaches a predetermined timer period. When the counter signal value C is greater than the counter reference value $C_{ref}$, then the road roughness discriminating circuit 50a produces a rough road condition indicative signal.

The control unit 50 further includes a vehicle speed discriminating circuit 50d which receives the vehicle speed indicative signal V from the vehicle speed sensor and compares the vehicle speed indicative signal with a low vehicle speed criterion $V_{ref}$. When the vehicle speed indicative signal value V is smaller than or equal to the low vehicle speed criterion $V_{ref}$, the vehicle speed discriminating circuit 50d outputs a low vehicle speed indicative signal and otherwise produces a high vehicle speed indicative signal.

The road roughness discriminating circuit 50a and the vehicle speed discriminating circuit 50d are connected to a mode selector circuit 50e. The mode selector circuit 50e is designed to perform selection of the suspension mode between HARD, MEDIUM and SOFT modes according to various suspension control parameters. The mode selector circuit 50e is responsive to the rough road condition indicative signal for selecting rough road adapted suspension characteristics. Furthermore, the mode selector circuit 50e varies mode selection depending upon the input from the vehicle speed discriminating circuit 50d. Namely, when the rough road condition indicative signal and the low vehicle speed indicative signal are present, the mode selector circuit 50e selects SOFT mode to produce a SOFT mode ordering suspension control signals and feed the same to front and rear driver circuits 50f and 50g which are connected to actuators 53 for controlling modes of variable damping-force shock absorbers 54 in front and rear suspension systems. On the other hand, when the rough road condition indicative signal and the high vehicle speed indicative signal are present, the mode selector circuit 50e produces a MEDIUM mode ordering suspension control signal.

The mode selector circuit 50e is also connected to a reset signal generator circuit 55 to feed a trigger upon outputting of the suspension control signal. The reset signal generator circuit 55 as triggered produces a reset signal for resetting the counter 50b and the timer 50c.

Figure 6:
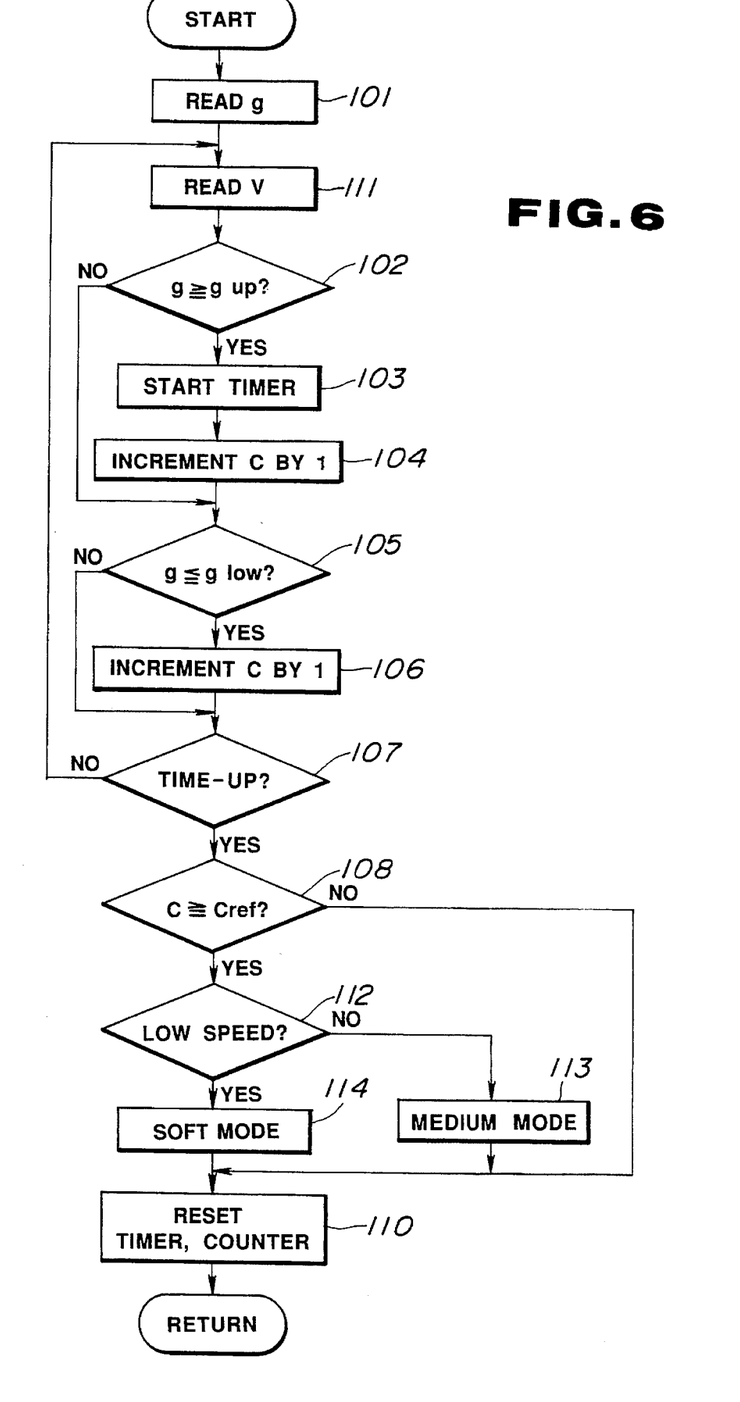
FIG. 6 is a flowchart showing a process of road roughness dependent suspension characteristics controls to be performed in the second embodiment of the suspension control system of FIG. 5.

Practical operation of the above-mentioned second embodiment of the suspension control system according to the present invention has been illustrated in FIG. 6 in a form of a flowchart. In the shown flowchart of FIG. 6, the steps which perform substantially the same function to that of the former embodiment will be represented by the same reference numerals and thus detailed discussion is neglected in order to avoid redundant description.

The shown routine is differentiated from the routine in the former embodiment in the steps 111, 112, 113 and 114. Namely, after reading out the lateral acceleration indicative signal g, the vehicle speed indicative signal V is read out at a step 111. On the other hand, when the counter value C as checked at the step 108 is greater than or equal to the counter reference value $C_{ref}$, a check is performed whether the vehicle speed is lower than or equal to the low vehicle speed criterion at the step 112. If the low vehicle speed indicative signal is detected as checked at the step 112, then the process goes to the step 113 for selecting the SOFT mode. On the other hand, when the low vehicle speed indicative signal is not detected as checked at the step 114, then the process goes to the step 114 for selecting the MEDIUM mode. After one of the steps 113 and 114 or in the alternative when the counter value as checked at the step 112 is smaller than the counter reference value, then the process goes to the step 110 for resetting the counter and timer. After resetting the counter and timer at the step 110, the process goes to END.

Figure 7:
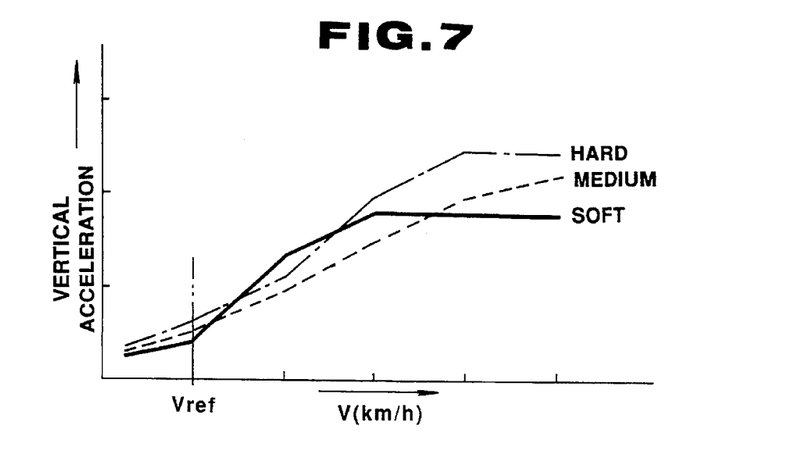
FIG. 7 is a chart showing variation of vertical acceleration relative to vehicle speed in various suspension modes.
Figure 8:
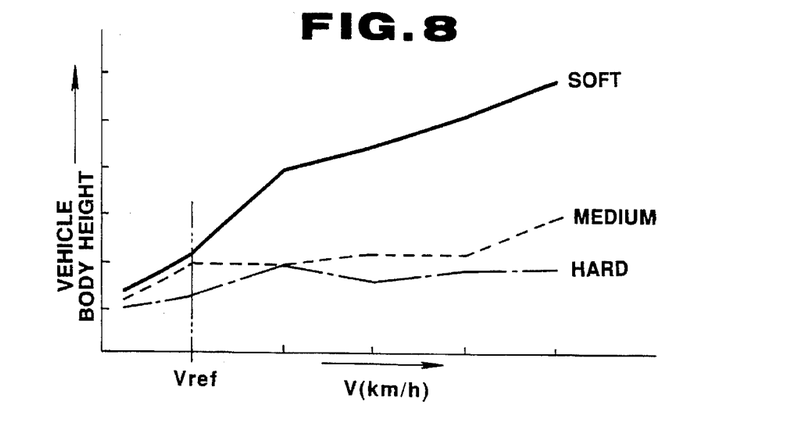
FIG. 8 is a chart showing variation of vehicular body height in relation to vehicular body in various suspension modes.

As can be seen from FIGS. 7 and 8, when the vehicle speed is lower than or equal to the low vehicle speed criterion, a higher level of riding comfort and road action substantially following undulation of the road surface can be obtained by setting the suspension characteristics at a SOFT mode as shown by a solid line. On the other hand, when the vehicle speed is higher than the low vehicle speed criterion, a satisfactorily high level of driving stability can be obtained by setting the suspension characteristics at a MEDIUM mode as illustrated by a broken line. Therefore, in the shown embodiment, a satisfactorily high level of riding comfort at a substantial low vehicle speed and a satisfactorily high level driving stability at a relatively high vehicle speed can be achieved.

It should be noted that the low vehicle speed criterion is set at a substantially low vehicle speed, for example 10 km/h.

Therefore, the invention fulfills all of the objects and advantages sought therefor.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments and modifications to the shown embodiments which can be embodied without departing from the principle of the invention set out in the appended claims.

For example, though the shown embodiment is directed to detection of road roughness detecting on the lateral acceleration exerted on the vehicular body, it may also be possible to utilize the longitudinal acceleration as a road roughness indicative parameter. Furthermore, though the shown embodiment is directed to the suspension system employing a variable damping force shock absorber, it may be possible to apply the invention to the pneumatic suspension system, an active or a semi-active suspension system, and so forth.

What is claimed is:

1. A system for detecting rough road conditions comprising;

sensor means, constructed and oriented to be exclusively responsive to lateral acceleration, for monitoring lateral acceleration exerted on a vehicular body and for producing a lateral acceleration indicative signal;

means for detecting each occurrence of a lateral acceleration indicative signal having a magnitude greater than a predetermined value and for producing a detection signal in response to each occurrence, said predetermined value being set larger than or equal to a maximum value (B) of a band having a predetermined width and a center which corresponds to a zero level of said lateral acceleration indicative signal;

means for counting each occurrence of said detection signal over a predetermined time period to provide a counter signal indicative of the counted value, said counting means varying said predetermined time period depending upon vehicle speed; and means for comparing the counter signal value with a predetermined threshold value for producing a rough road indicative signal when the counter signal value is greater than or equal to the threshold value, said predetermined threshold value being defined by a first predetermined number of times per said predetermined time period which exceeds a second predetermined number of times per said predetermined time period by a predetermined amount, said second predetermined number of times per said predetermined time period being generally indicative of a rolling motion of the vehicle, and said predetermined amount being selected to separate said first 2. A system as set forth in claim 1, wherein said sensor means is designed to produce a first polarity of lateral acceleration indicative sensor signal in response to the lateral acceleration in a first direction and a second polarity of lateral acceleration indicative sensor signal in response to the lateral acceleration in a second direction, in which said second polarity is opposite to said first polarity and said second direction is opposite to said first direction, and said detecting means produces said detection signal when the lateral acceleration indicative signal value is out of a predetermined range of values defined by a first polarity of criterion value and a second polarity of criterion value.

3. A system for detecting road conditions comprising:
- a lateral G sensor for monitoring lateral acceleration exerted on a vehicular body and for producing a lateral acceleration signal indicative thereof;
- means for detecting each occurrence of the lateral acceleration indicative signal having a magnitude greater than a predetermined value and for producing a detection signal each time the magnitude of the lateral acceleration signal is greater than the predetermined value, said predetermined value being set larger than or equal to a maximum value (B) of a bandwidth which has a center that generally corresponds to a zero level of the longitudinal acceleration signal;
- means for counting each occurrence of said detection signal over a predetermined period and for providing a counter signal indicative of the counted value over said predetermined period; and
- means for comparing the counter signal value with a predetermined threshold value for producing a rough road indicative signal when the counter signal value is greater than or equal to the threshold value, said predetermined threshold value being a first number of times per said predetermined time period which exceeds a second number of times per said predetermined time period by a predetermined amount, said second number of times per said predetermined time period being generally indicative of a rolling motion of the vehicle, and said predetermined amount being selected to separate said first predetermined number from said second number sufficiently to ensure that rolling motion of the vehicle body and rough road conditions can be distinguished from one another.

4. A system as set forth in claim 3, wherein said sensor means is designed to produce a first polarity of longitudinal acceleration indicative sensor signal in response to the longitudinal acceleration in a first direction and a second polarity of longitudinal acceleration indicative sensor signal in response to the longitudinal acceleration in a second direction, in which said second polarity is opposite to said first polarity and said second direction is opposite to said first direction, and said detecting means produces said detection signal when the longitudinal acceleration indicative signal value is out of a predetermined range of values defined by a first polarity of criterion value and a second polarity of criterion value.

5. A suspension control system for an automotive vehicle comprising:

- a variable characteristic suspension system disposed between a vehicular body and a suspension member which rotatably supports a road wheel, said variable characteristic suspension system being variable to enable a plurality of characteristics ranging between a hard suspension characteristic and a soft suspension characteristic, to be selectively produced;
- a sensor means for exclusively monitoring an acceleration which acts on a vehicular body in a plane which is essentially horizontal with respect to the vehicle body and for producing an acceleration signal specifically indicative of horizontal acceleration;
- means for detecting each occurrence of said acceleration signal having a magnitude greater than a predetermined value to produce a detection signal, said predetermined value being set approximately equal to a value corresponding to a maximum value of a predetermined bandwidth (B);
- first screening means for counting said detection signals over a predetermined time period to provide a counter signal indicative of the counted value, said counting means varying a length of said predetermined period in accordance with vehicle speed;
- second screening means for comparing the counter signal value with a predetermined threshold value for producing a rough road indicative signal when the counter signal value is greater than or equal to the threshold value, said predetermined threshold value being a first predetermined number of times per said predetermined time period which exceeds a second predetermined number of times per said predetermined period by a predetermined amount, said second predetermined number of times being approximately equal to a number of times per said predetermined period which is generated when the acceleration indicative signal of the acceleration sensor which exceeds the maximum magnitude of said predetermined bandwidth (B) is generated in response to at least one of rolling motion, lifting motion, or pitching motion of the vehicle, and wherein said predetermined amount is selected to separate said first predetermined number from said second number sufficiently to ensure that the rough road conditions can be distinguished from the at least one of rolling, lifting and pitching motions; and
- means for deriving a suspension control signal for adjusting suspension characteristics of said variable characteristic suspension system, said suspension control signal deriving means being responsive to said rough road indicative signal to produce said suspension control signal which selects a predetermined soft suspension characteristic from among said plurality of suspension characteristics irrespective of the suspension control characteristics which would, in the absence of said rough road indicative signal, be selected on the basis of said acceleration signal which has not been respectively screened for magnitude and frequency by said first and second screening means.

6. A suspension control system as set forth in claim 5, wherein said sensor means monitors a lateral acceleration exerted on the vehicular body.

7. A suspension control system as set forth in claim 5, wherein said variable characteristics suspension system has variable suspension characteristics between a hard suspension characteristic, a soft suspension characteristic and a medium suspension characteristic which is set between said hard suspension characteristic and said soft suspension characteristic, and wherein said suspension control system selects said medium suspension characteristic in response to said rough road indicative signal.

8. A suspension control system as set forth in a claim 7, wherein said variable characteristic suspension system employs a three-way variable damping force shock absorber.

9. A suspension control system as set forth in claim 7, which further comprises a vehicle speed sensor for monitoring vehicle speed to produce a vehicle speed indicative signal, and said suspension control signal deriving means is responsive to said vehicle speed indicative signal having a value smaller than or equal to a vehicle speed reference value representative of a substantially low vehicle speed criterion, to select soft suspension characteristics and selects said medium suspension characteristic otherwise.

10. A suspension control system as set forth in claim 7, wherein said sensor means is designed to produce a first polarity of acceleration indicative sensor signal in response to the acceleration in a first direction and a second polarity of acceleration indicative sensor signal in response to the acceleration in a second direction, in which said second polarity is opposite to said first polarity and said second direction is opposite to said first direction, and said detecting means produces said detection signal when the acceleration indicative signal value is out of a predetermined range of values defined by a first polarity criterion value and a second polarity of criterion value.

11. A suspension control system for an automotive vehicle comprising:
a variable characteristic suspension system disposed between a vehicular body and a suspension member which rotatably supports a road wheel, said variable characteristic suspension system being conditionable to produce a suspension characteristic which is selected from among a plurality of suspension characteristics that include a hard suspension characteristic and a soft suspension characteristic;
a first sensor means for exclusively monitoring an acceleration which acts in a plane that is horizontal with respect to the vehicle body, and for producing a rough road indicative signal in response to a frequency, at which the monitored acceleration exceeds a predetermined magnitude; being in excess of a predetermined limit;
a second sensor means for monitoring a vehicle speed to produce a vehicle speed indicative signal;
means responsive to said vehicle speed indicative signal for detecting a vehicle speed which is lower than or equal to a predetermined low vehicle speed, and for producing a low vehicle speed indicative signal; and
means responsive to said rough road indicative signal and said low vehicle speed indicative signal for producing a suspension control signal which (a) sets the suspension characteristic to a setting selected from among said plurality of suspension characteristics when at least one of said low vehicle speed indicative signal and said rough road indicative signal is absent, and which (b) sets said suspension characteristic to a predetermined suspension characteristic which is selected from among said plurality of characteristics and which is suitably soft for damping vertical vibration produced when the vehicle traverses a rough road, when said low vehicle speed indicative signal and said rough road indicative signal are concurrently present.

12. A suspension control system as set forth in claim 11, wherein said first sensor means includes:

means for producing a monitored acceleration signal indicative of the monitored acceleration;
means for counting a number of times said monitored acceleration signal has a magnitude greater than the predetermined limit over a predetermined period, and for producing a counter signal indicative of the counted value; and
means for comparing the counter signal value with a predetermined threshold value for producing said rough road indicative signal when the counter signal value is greater than or equal to the threshold value.

13. A suspension control system as set forth in claim 12, wherein said first sensor means monitors a lateral acceleration exerted on the vehicular body.

14. A suspension control system as set forth in claim 13, wherein said variable characteristic suspension system has variable suspension characteristics including a hard suspension characteristic, a soft characteristic and a medium suspension characteristic which is set between said hard and soft suspension chacteristics, and said suspension control system selecting said medium suspension characteristic in response to said rough road indicative signal.

15. A suspension control system as set forth in claim 14, wherein said variable characteristic suspension system employs a three-way variable damping force shock absorber.

16. A suspension control system as set forth in claim 15, wherein said suspension control signal deriving means is responsive to said vehicle speed indicative signal to select said soft suspension characteristic when said vehicle speed indicative signal has a value smaller than or equal to a vehicle speed reference value representative of a substantially low vehicle speed and selects said medium suspension characteristic when said vehicle speed indicative signal has a value greater than said vehicle speed reference value.

17. A suspension control system as set forth in claim 16, wherein said counting means varies the length of said predetermined period in accordance with vehicle speed so that the predetermined period is reduced as the vehicle speed increases.

18. A suspension control system as set forth in claim 17, wherein said first sensor means is designed to produce a first polarity of acceleration indicative sensor signal in response to the acceleration in a first direction and a second polarity of acceleration indicative sensor signal in response to the acceleration in a second direction, in which said second polarity is opposite to said first polarity and said second direction is opposite to said first direction, and said detecting means produces said detection signal when the acceleration indicative signal value is out of a predetermined range of values defined by a first polarity criterion value and a second polarity criterion value.

19. In a control system for an automotive suspension system including:
damping means disposed between a road wheel and a vehicular body for generating a damping force which resists relative motion between said road wheel and said vehicular body, said damping means including means for producing a plurality of predetermined damping characteristics which can be selected by a control command to vary a damping mode of said damping means between at least a rough road mode and a normal mode, and
a control unit electrically connected to said damping means for supplying said control command for varying the damping characteristics produced by said damping means in accordance with a vehicle traveling condition, said control unit being sensitive to a road roughness condition for setting said damping characteristic of said damping means to produce said rough road mode, a system for detecting roughness of the road comprising:

a lateral acceleration sensor for monitoring lateral acceleration exerted on the vehicular body and for producing a lateral acceleration indicative signal exclusively representative of the magnitude of the detected lateral acceleration;

a vehicle speed sensor for monitoring vehicle speed for producing a vehicle speed indicative signal representative of the detected vehicle speed;

a detecting means for receiving said lateral acceleration indicative signal and comparing the magnitude of said lateral acceleration indicative signal with a predetermined threshold value and for outputting a pulse form detection signal each time said lateral acceleration indicative signal has a magnitude greater than or equal to said threshold value;

a counting means responsive to said pulse form detection signal for detecting occurrence of said detecting signal over a predetermined time period so that a rough road condition is detected when the detected occurrence is greater than a given threshold value, said given threshold value being at least larger than (a) one and (b) a first predetermined number of times per predetermined time period which exceeds a second number of times by a predetermined amount, said second number of times per said predetermined time period being generally indicative of a number of times said pulse form detection signal is generated per said predetermined time period in response to rolling of the vehicle, and for outputting a rough road condition detection signal to said control unit, said predetermined amount being selected to separate said first predetermined number from said second number sufficiently to ensure that the rough road condition can be distinguished from the rolling motion; and speed discrimination means responsive to said vehicle speed indicative signal for comparing a vehicle speed indicative signal value with a predetermined vehicle speed and for discriminating between a low traveling speed condition and a high traveling speed condition, said counting means being responsive to said speed discrimination means to vary said predetermined time period in accordance with the discriminated speed condition.

20. In a control system for an automotive suspension system including damping means disposed between a road wheel and a vehicular body for generating a damping force which resists relative motion between said road wheel and said vehicular body, said damping means including means for producing a plurality of predetermined damping characteristics which can be selected by a control command to produce at least a rough road mode and a normal mode, and a control unit electrically connected to said damping means for supplying said control command for varying the damping characteristic depending upon a vehicle traveling condition, said control unit being sensitive to an indication of a road roughness condition for setting said damping characteristic of said damping means to produce said rough road mode, a system for detecting roughness of the road comprising:

a lateral acceleration sensor which is constructed and arranged to exclusively monitor lateral acceleration exerted on the vehicular body and for producing a lateral acceleration indicative signal representative of a magnitude of the detected lateral acceleration;

a vehicle speed sensor for monitoring vehicle traveling speed and for producing a vehicle speed indicative signal representative of the detected vehicle speed;

detecting means for receiving said lateral acceleration indicative signal, comparing the magnitude of said lateral acceleration indicative signal with a predetermined threshold value and for outputting a pulse form detection signal at each occurrence of said lateral acceleration indicative signal having a magnitude greater than or equal to said threshold value;

counting means for receiving said detection signal, detecting a frequency of occurrence of said detection signal over a predetermined period so that a rough road condition is detected when the detected frequency is higher than a given frequency threshold, said given frequency threshold being a predetermined amount higher than that at which said lateral acceleration indicative signal is produced in response to a rolling motion of the vehicle, and for outputting a rough road condition detection signal to said control unit; and means responsive to said vehicle speed indicative signal for comparing the vehicle speed indicative signal value with a predetermined vehicle speed and for discriminating between a low traveling speed condition and a high traveling speed condition, said counting means being responsive to said discriminating means in a manner effective to vary said given frequency threshold in accordance with the discriminated speed condition, said damping means being responsive to said rough road condition detection signal in a manner which induces said rough road mode.

21. A control system for an automotive suspension system comprising:

damping means disposed between a road wheel and a vehicular body, and responsive to a control command, for generating a variable damping force which resists relative motion between said road wheel and said vehicular body and produces at least a rough road mode and a normal mode;

a control unit electrically connected to said damping means for supplying said control command to said damping means and varying said damping characteristic depending upon a vehicle traveling condition, said control unit being sensitive to an indication of rough road condition for setting said damping characteristic of said damping means to produce said rough road mode;

a system for detecting roughness of the road comprising;

a lateral acceleration sensor for exclusively monitoring lateral acceleration exerted on the vehicular body and for producing a lateral acceleration indicative signal representative of the magnitude of the detected lateral acceleration;

a vehicle speed sensor for monitoring vehicle travelling speed to produce a vehicle speed indicative signal representative of the detected vehicle speed;

detecting means for receiving said lateral acceleration indicative signal and comparing the magnitude of said lateral acceleration indicative signal with a predetermined threshold value for outputting a pulse form detection signal at each occurrence of said lateral acceleration indicative signal having a magnitude greater than or equal to said threshold value;

counting means for receiving said detection signal for detecting a frequency of occurrence of said detection signal over a predetermined period, for detecting a rough road condition when the detected frequency is higher than a given frequency threshold, and for outputting a rough road condition detection signal to said control unit and induces said control unit to issue a control command which causes said damping means to produce said rough road mode, said given frequency threshold being set as a first predetermined frequency which exceeds a second predetermined frequency by a predetermined amount, said second predetermined frequency being a frequency indicative of vehicle roll, and said predetermined amount being selected to separate said first frequency from said second frequency sufficiently to ensure that the rough road conditions can be distinguished from the rolling motion; and means responsive to said vehicle speed indicative signal for comparing the vehicle speed indicative signal value with a predetermined vehicle speed criterion, for discriminating between a low traveling speed condition and a high traveling speed condition and for modifying said given frequency threshold in accordance with he vehicle speed condition which is discriminated.

22. A system comprising:

sensor means for exclusively monitoring a horizontally acting lateral acceleration exerted on a vehicular component for producing a lateral acceleration indicative signal;

vehicle speed detecting means;

means for detecting each occurrence of said lateral acceleration indicative signal having a magnitude greater than a predetermined value and for producing a detection signal for each occurrence;

means for counting said detection signal over one of a predetermined time period and a predetermined running distance, to provide a counter signal indicative of the counted value, means for comparing the counter signal value with a predetermined threshold value for producing a rough road indicative signal when the counter signal value is greater than or equal to the threshold value, said predetermined threshold value being such as a first predetermined number of times per said predetermined time period which exceeds a second predetermined number of times per said predetermined time period or per said predetermined running distance, said second predetermined number of times per said predetermined time period or per said predetermined running distance being equal to a number of times per said predetermined time period or per said predetermined running distance generated in response to vehicle roll; and suspension control means for controlling a damping force of each suspension unit located between the vehicle body and each wheel according to the rough road indicative signal and according to the vehicle speed.

23. A system for detecting rough road conditions as set forth in claim 22, wherein one of said predetermined period and predetermined running distance is varied in accordance with increase in vehicle speed.

24. A system comprising:

suspension means selectively conditionable to produce one of a hard and a soft damping characteristic a single sensor for sensing horizontal acceleration and for outputting a signal indicative of the sensed horizontal acceleration to said suspension means;

screening means for screening said signal for a frequency with which said signal has a magnitude greater than a predetermined value; and means responsive to a detection of the frequency which exceeds the predetermined value for issuing a rough road indicative signal to said suspension means and for inducing said suspension means to produce said soft damping characteristic irrespective of what conditioning would otherwise be induced by said signal.

* * * * *